United States Patent [19]

Howeth

[11] 4,444,280

[45] Apr. 24, 1984

[54] DRILL CUTTINGS CONVEYING APPARATUS WITH FLEXIBLE DUCT FOR IMPROVED GROUND CLEARANCE

[76] Inventor: D. Franklin Howeth, P.O. Box 6517, Fort Worth, Tex. 76115

[21] Appl. No.: 332,616

[22] Filed: Dec. 21, 1981

Related U.S. Application Data

[63] Continuation-in-part of Ser. No. 223,036, Jan. 7, 1981.

[51] Int. Cl.³ .......................... E21B 21/06; E21C 7/02
[52] U.S. Cl. ...................................... 175/206; 175/209
[58] Field of Search ............... 175/209, 206, 210, 211, 175/207

[56] References Cited

U.S. PATENT DOCUMENTS

| | | | |
|---|---|---|---|
| 2,041,689 | 5/1936 | Baumeister et al. | 175/209 |
| 2,634,952 | 4/1953 | Brinkley | 175/206 X |
| 3,811,518 | 5/1974 | Kalaf et al. | 175/60 |
| 4,332,301 | 6/1982 | Jonell | 175/50 |

*Primary Examiner*—Stephen J. Novosad
*Attorney, Agent, or Firm*—Hubbard, Thurman, Turner & Tucker

[57] ABSTRACT

A drill cuttings conveying head for a portable drill rig includes a flexible tubular duct portion which is operable in conjunction with extension and retraction cylinders for the head to bend the duct portion sufficiently to permit retraction of the head to provide suitable ground clearance for transport of the rig. An actuator for bending and straightening the flexible duct portion is interconnected by way of a pressure fluid control circuit with the head extension and retraction cylinders for movement of the duct portion in conjunction with the extension and retraction of the conveying head.

10 Claims, 3 Drawing Figures

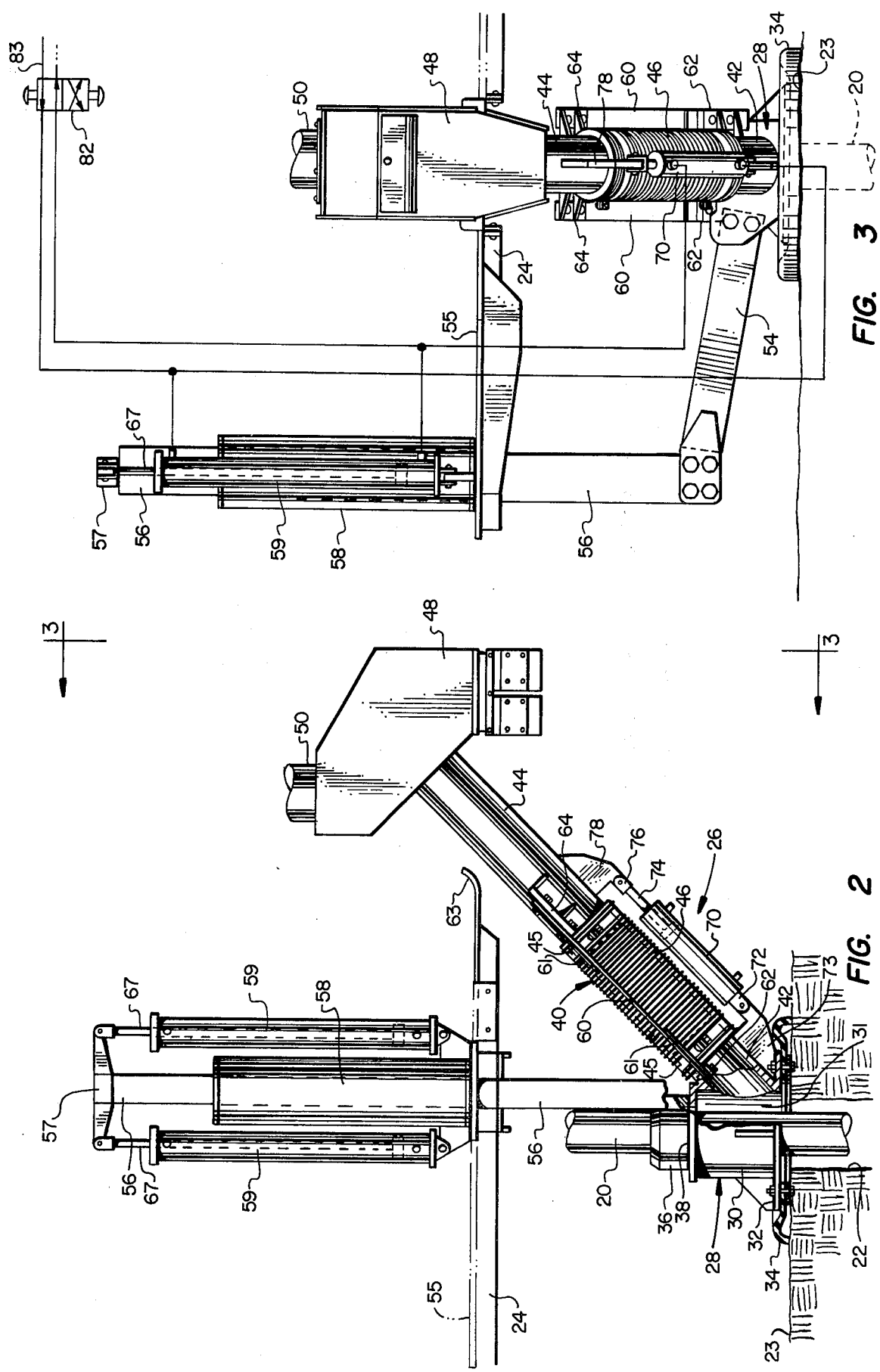

DRILL CUTTINGS CONVEYING APPARATUS WITH FLEXIBLE DUCT FOR IMPROVED GROUND CLEARANCE

CROSS REFERENCE TO RELATED APPLICATION

This application is a continuation-in-part of copending application Ser. No. 223,036 filed Jan. 7, 1981.

BACKGROUND OF THE INVENTION

Field of the Invention

The present invention pertains to an improved drill cuttings conveying apparatus including a lifting head member adapted to be disposed around a drillhole for conveying an air flowstream laden with particulate matter through a flexible duct section to a cuttings separating and collecting system. The apparatus includes mechanism for bending the flexible duct section when moving the lifting head between working and retracted positions with respect to a drill rig wherein improved ground clearance is provided.

BACKGROUND ART

The above referenced patent application pertains to improvements in conveying and collecting systems for particulate matter discharged from a drillhole by a bailing air flowstream. In the art of earth drilling equipment, it is known to use a high velocity jet stream of air to remove the drill cuttings during formation of the drillhole. It has become necessary and certainly desirable to provide a type of system as disclosed in the referenced patent application which includes several embodiments of a hood or material lifting head member which is disposed around the drillhole in surrounding relationship to the drill stem and normally in contact with the ground surface. The lifting head forms an enclosure which preferably includes a material discharge duct extending generally upwardly at an acute angle with respect to the axis of the drill stem and connected to an enclosure forming a drill cuttings separation chamber. The structure disclosed and claimed in the referenced patent application has proven to be a significant step forward in the art of drill cuttings conveying and collection systems.

However, one problem associated with adapting the improved system to new as well as existing drilling equipment pertains to the fact that the lifting head and associated discharge duct structure are sometimes difficult to mount for extension and retraction with respect to the ground surface and wherein, in the retracted position of the lifting head, adequate ground clearance is provided during transport of the drill rig from one work site to another. Most types of drilling rigs which may benefit from the invention disclosed and claimed in the referenced application include a generally horizontal deck or frame through which the drill stem projects generally downwardly toward the ground surface. This deck structure is provided for supporting a drill collar or centralizer as well as for supporting drill pipe handling wrenches and joint makeup and breakout mechanisms. The presence of the deck structure and its position above the ground both during drilling and transport of the drill rig, is normally dictated by factors in rig design and operating requirements which exclude consideration of the drill cuttings handling apparatus. However, the drill cuttings conveying or lifting head should be movable from its working position to a retracted position for transport of the rig and, in the retracted position, provide suitable ground clearance to prevent damage to the head itself. In this regard, the present invention provides a unique solution to the problem associated with extendable and retractable drill cuttings lifting heads, and particularly, of the general type disclosed and claimed herein as well as in the referenced patent application.

SUMMARY OF THE INVENTION

The present invention provides an improved drill cuttings conveying and collection apparatus including a material conveying or lifting head member which is connected to an enclosure by structure including a flexible duct section which supports the enclosure and extends generally upwardly, with respect to the ground adjacent the drillhole, at an acute angle with respect to the axis of the drill stem for conducting drill cuttings away from the vicinity of the drillhole. In particular, the improved apparatus of the present invention is adapted to be mounted under the frame or deck structure of certain types of drilling rigs while yet providing suitable ground clearance in a retracted position of the lifting head so that the drilling rig may be transported from one work site to another without risk of damaging the lifting head or associated structure.

In accordance with one aspect of the present invention, the improved drill cuttings conveying apparatus includes a flexible duct section interconnecting the lifting head member with an enclosure forming a separator for separating relatively coarse or heavier drill cuttings from a bailing air flowstream. The apparatus also includes mechanism for extending and retracting the lifting head with respect to the ground surface adjacent the drillhole. In moving to the retracted position, the apparatus is engageable with the overhanging frame or deck of the rig and the flexible duct section may undergo deflection to permit adequate retraction of the lifting head so that suitable ground clearance is provided. The duct structure interconnecting the lifting head with the separator enclosure includes elongated leaf or flat strip type springs which are arranged for biasing the flexible duct section in a substantially straight condition so that the air flowstream laden with particulate matter flowing through the duct will not be obstructed and so that the drill cuttings separating enclosure will be maintained in proper alignment with the lifting head. However, the flexible duct section is adapted to undergo easy deflection in response to engagement of the apparatus with a portion of the drill rig frame or deck upon retraction of the lifting head member and in response to operation of a cylinder and piston type actuator interconnecting two rigid portions of the conveying duct structure. The leaf springs are preloaded or subjected to predetermined initial deflection to assist in maintaining the duct structure substantially in the aligned or working position. Moreover, the cylinder actuator acts as a stop member to counter the preload biasing force of the leaf springs to hold the flexible duct section straight and, when actuated to retract its piston rod, the actuator forms a bend in the flexible duct section.

The present invention still further includes a control circuit for the duct actuator which is also adapted for controlling an actuator to extend and retract the lifting head whereby both actuators are operated in unison to bend the duct away from the drill rig frame when the lifting head is moved to the retracted or transport position.

In accordance with yet a further aspect of the present invention, there is provided apparatus including a drill cuttings conveying or lifting head which is provided with improved means for moving the head member between a retracted transport position and an extended or working position either directly adjacent to or in engagement with the ground surface surrounding the drillhole.

Those skilled in the art will recognize further advantages and superior features of the present invention upon reading the detailed description which follows in conjunction with the drawings.

BRIEF DESCRIPTION OF THE DRAWINGS

FIG. 2 is a side elevation view on a larger scale showing details of the apparatus including the lifting head and the flexible duct section; and FIG. 3 is an end view taken from the line 3—3 of FIG. 2.

DESCRIPTION OF THE PREFERRED EMBODIMENT

Figure 1:
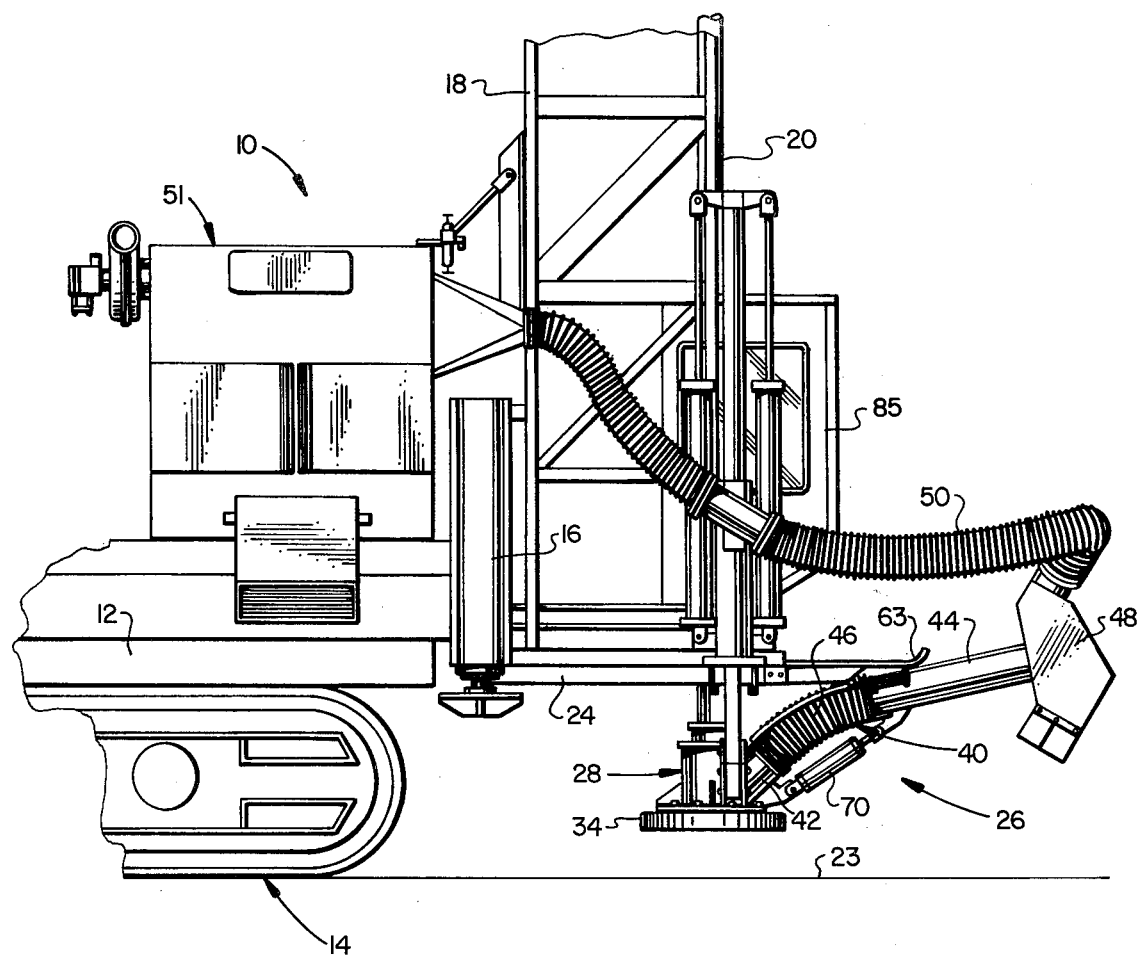
FIG. 1 is a side elevation view of a portion of a portable rotary earth drilling rig including the apparatus of the present invention.

Referring to FIG. 1 of the drawings, there is illustrated a portion of a portable rotary earth drilling rig generally designated by the numeral 10. The rig 10 includes a main frame 12 supported by a crawler track type undercarriage 14. The rig 10 is further provided with a set of hydraulic jacks 16, one shown in FIG. 1, which are arranged in a triangular pattern or at the four corners of the frame 12. The jacks 16 are adapted to be extended for raising the rig to take the weight of the rig off of the crawler undercarriage and to stabilize the rig during drilling operations. The rig 10 includes a conventional mast 18 for supporting a drilling head, not shown, to extend and retract a drill stem 20 for drilling a blasthole or the like. A frame portion 24 extends beyond the main frame 12 beneath the mast 18 and provides a work platform as well as support structure for apparatus such as drill pipe wrenches, drill collars or, in regard to some rigs, a rotary table.

The drill rig 10 is provided with a total conveying and collection system for handling the drill cuttings ejected from the drillhole, which system is preferably in accordance with the invention disclosed in U.S. patent application Ser. No. 223,036 which is incorporated herein by reference. The present invention represents certain improvements in the arrangement of the portion of the apparatus referred to as the lifting head and which is distinguished from conventional drill cuttings enclosures or hoods in a number of ways discussed in the referenced patent application.

Referring also to FIGS. 2 and 3 of the drawings, the improved drill cuttings conveying apparatus of the present invention is generally designated by the numeral 26 and includes a member, preferably characterized as a material conveying or lifting head 28. The lifting head 28 forms an enclosure which may be disposed around a drillhole 22 and includes a tubular portion 30 forming a flow passage 31. The head 28 also includes a lower annular flange 32. A flexible skirt 34 is suitably fixed to the flange 32 in a manner similar to that disclosed in the referenced patent application to provide a secondary seal with the surface of the ground 23 around the drillhole 22. The lifting head 28 also includes a generally annular seal ring or collar 36 adapted to rest on a transverse upper surface 38 of the lifting head to form a relatively fluid tight seal to prevent drill cuttings from being ejected upward around the periphery of the drill stem 20 and, particularly, to prevent a substantial inflow of ambient atmospheric air into the cuttings flow path of the conveying system.

The apparatus 26 also includes structure comprising a tubular duct assembly 40 which is in flow receiving communication with the passage 31 and extends upwardly at an angle of approximately 45° with respect to the longitudinal axis of the head 28 and the central longitudinal axis of the drill stem 20. The duct assembly 40 includes elongated rigid duct portions 42 and 44 which are interconnected by a flexible section 46. The flexible duct section 46 may be formed of a corrugated reinforced elastomer and is clamped to the rigid duct portions 42 and 44 by suitably spaced apart band clamps 45. A coarse drill cuttings separator enclosure 48 is fixed to the duct portion 44 and includes an outlet duct 50 interconnecting the enclosure 48 with a dust collection and filter unit, generally designated by the numeral 51 in FIG. 1, which also may be of the type disclosed in Application Ser. No. 223,036. The enclosure 48 is adapted to receive the drill cuttings and bailing air flowstream, and performs separation of relatively coarse drill cuttings from the bailing air, which cuttings are periodically dropped out of the enclosure through doors 49 for deposit on the ground away from the drillhole.

The lifting head 28 also includes a laterally extending arm portion 54, FIG. 3, which is connected to an elongated actuating rod 56 extending generally vertically upwardly through a deck plate 55 of the frame portion 24 and through a guide member 58 mounted on the deck plate. The rod 56 is preferably formed of a section of structural metal rectangular tube and is connected at its upper end to a pair of hydraulic or pneumatic cylinder type actuators 59 by means of a yoke member 57. The actuators 59 together with a guide member 58 for the rod 56 are suitably mounted on the deck plate 55. The actuators 59 are operable to extend the head 28 downwardly with respect to the rig frame to place the head in a working position in sealing engagement with the ground surface, as shown in FIGS. 2 and 3, to sufficiently retract the head to permit transport of the drill rig from one work site to another. Since the frame portion 24 is raised from the ground surface 23 when the aforementioned rig jacks are extended, during operation of the drill rig, a sufficient amount of clearance is normally provided to permit the duct assembly 40 to extend at an angle which will not reduce the momentum of the drill cuttings being ejected from the drillhole and flowing into the duct assembly from the interior flow passage of the head 28. However, it is important that the head 28 be operable to be sufficiently retracted upwardly under the deck plate 55 when the rig 10 is resting on its undercarriage 14 and is traversing rough terrain from one work site to another.

Heretofore, the requirements for drill cuttings conveying and collecting apparatus have not been such that an arrangement such as the head 28 including the duct assembly 40 has been realized to be of advantageous design. However, with the development of the inventions disclosed and claimed herein and in Application Ser. No. 223,036, it has been determined that it is desirable to provide the duct assembly 40 projecting upwardly at an angle with respect to the lifting head 28. Moreover, the problem of providing clearance for the duct assembly 40 has been particularly vexatious due to the substantial distance over which the head 28 must be moved between the extended or working position and a retracted transport position.

In accordance with the present invention however, by providing the flexible duct section 46 interconnecting the head 28 and the enclosure 48 together with structure described herein, it has been possible to provide a drill cuttings conveying and collection apparatus which is particularly adapted for use on portable drill rigs which require a relatively long extension and retraction distance for the material lifting head member for movement between working and transport positions.

As illustrated in FIGS. 2 and 3, the substantially rigid duct portions 42 and 44 are also interconnected by elongated flat band or leaf type spring members 60 which are suitably clamped at their opposite ends to bracket portions 62 and 64 formed on the sides of the duct portions 42 and 44, respectively. The spring members 60 also include cantilever support strips 61 extending from the respective brackets 62 and 64. The spring members 60 are adapted to bias the duct portions 42 and 44 in alignment in such a way that the duct assembly 40 is substantially straight and does not impede the flow of drill cuttings emanating from the drillhole 22. The spring members 60 are preferably preloaded or deflected a predetermined amount in the position shown in FIGS. 2 and 3 to aid in stabilizing the duct assembly 40 in the straight position.

A double acting pressure fluid cylinder and piston type actuator 70 is mounted on the duct assembly 40 and is fully extended in the position shown in FIG. 2 to act as a stop for the springs 60 and to provide a stable structure for the duct assembly 40 and to also assist in support of the enclosure 48. The actuator 70 includes a clevis portion 72 connected to a bracket 73, extending from the duct portion 42, and a piston rod 74 having a clevis 76 connected to a bracket 78 formed on the duct portion 44.

Upon actuation of the cylinder actuator 70 to retract its piston rod 74, the duct section 46 is bent generally downwardly so that the duct assembly 40 assumes the position shown in FIG. 1 to permit retraction of the lifting head 28. Upon retraction of the lifting head 28 up under the frame portion 24 by actuation of the cylinder actuators 59, the duct portion 44 engages a stop member 63. The stop member 63 is mounted on and projects from the edge of the frame portion 24 to serve as a steadyrest for the duct portion 44 in the retracted position of the apparatus 26. Although the duct assembly 40 could be maintained in its straight and bent positions by the springs 60 and reliance placed on the stop member 63 for forcing the bending action on the duct portion 46, the actuator 70 provides positive movment and retention of the duct assembly 40 in the straight and bent conditions and reduces the loading of the actuators 59 in that these actuators do not have to overcome the bias force of the springs 60 when retracting the head.

As illustrated schematically in FIG. 3, the cylinder actuator 70 is advantageously interconnected with the head extension and retraction cylinders 59 by a pressure fluid control circuit including a suitable directional control valve 82 which may be connected to a source of pressure air or hydraulic fluid, not shown, by way of a conduit 83. The valve 82 is preferably located on a suitable control panel in the operator cab 85, FIG. 1. Accordingly, when the control valve 82 is actuated to cause cylinders 59 to extend the rod 56 downwardly, pressure fluid is also supplied to the cylinder actuator 70 to extend the piston rod 74 so that the duct section 46 is held in a substantially straight condition thanks also to the springs 60. Conversely, when the control valve 82 is actuated to retract the piston rods 67 of the cylinders 59, the cylinder actuator 70 is also simultaneously retracted to bend the duct section 46 to permit suitable retraction of the lifting head 28 to the position shown in FIG. 1.

Those skilled in the art will appreciate that various features, characteristics and advantages of the present invention have been set forth herein or are readily realizable from the detailed description of the preferred embodiment. However, the disclosure is illustrative and various changes may be made while utilizing the principles of the present invention and falling within the scope of the invention as expressed in the apppended claims.

What I claim is:

1. A drill cuttings conveying apparatus for a portable drill rig which generates drill cuttings and evacuates said drill cuttings from a drillhole with a velocity flowstream of bailing air, said drill rig including a frame including a portion generally overlying and disposed above said drillhole during drilling operations, said apparatus being supported generally beneath said frame for conveying said drill cuttings away from the vicinity of said drillhole;

said apparatus including a head member forming a flow conducting passage for conveying substantially all of said flowstream away from the vicinity of said drillhole;

an enclosure disposed spaced from said head member for separating drill cuttings from said flowstream;

means for moving said head member with respect to said frame between a retracted position and an extended position of said head member for conveying said flowstream from said drill hole;

a duct assembly interconnecting said head member and said enclosure, said duct assembly including a flexible duct section interconnecting a first substantially rigid duct portion connected to said head member and a second substantially rigid duct portion, said flexible duct section being operable to effect bending of said duct assembly with respect to said head member to permit movement of said head member to said retracted position for transport of said drill rig; and actuator means for bending said flexible duct section of said duct assembly including a pressure fluid actuator connected to said duct assembly and operable to move said duct assembly from a substantially straight configuration to a bent configuration to permit said head member to be retracted.

2. The apparatus set forth in claim 1 wherein:
said duct assembly extends generally upwardly from said head member at an angle with respect to the longitudinal axis of said drillhole.

3. The apparatus set forth in claim 1 wherein:
said actuator includes a cylinder and piston type actuator connected at its opposite ends to said rigid duct portions of said duct assembly at opposite ends of said flexible duct section.

4. The apparatus set forth in claim 3 wherein:
said yieldable biasing means comprises elongated leaf spring means interconnecting said rigid duct portions said leaf spring means being preloaded in the straight configuration of said duct assembly and cooperable with said actuator to hold said duct assembly in said straight configuration.

5. The apparatus set forth in claim 1 together with:
means for yieldably biasing said flexible duct section in a substantially straight configuration.

6. The apparatus set forth in claim 1 wherein:
said means for moving said head member includes a pressure fluid actuator, and said apparatus includes a control circuit interconnecting said actuators for operating said actuators to retract said head member and bend said duct assembly substantially simultaneously.

7. A drill cuttings conveying apparatus for a portable drill rig which generates drill cuttings and evacuates said drill cuttings from a drillhole with a high velocity flowstream of bailing air, said drill rig including a frame including a portion generally overlying and disposed above said drillhole during drilling operations, said apparatus being supported generally beneath said frame for conveying said drill cuttings away from the vicinity of said drillhole;
said apparatus including a head member forming a flow conducting passage for conveying substantially all of said flowstream away from the vicinity of said drillhole;
an enclosure disposed spaced from said head member for separating drill cuttings from said flowstream;
a duct assembly interconnecting said head member and said enclosure and including a portion operable to effect bending of said duct assembly with respect to said head member to permit movement of said head member to a retracted position for transport of said drill rig;
said head member is connected to a generally laterally projecting arm connected to a vertically extending rod member, said rod member being disposed in a guide mounted on said frame; and
pressure fluid cylinder actuator means connected to said rod member for moving said head member with respect to said frame between said retracted position and an extended position of said head member for conveying said flowstream from said drillhole.

8. A drill cuttings conveying apparatus for a portable drill rig which generates drill cuttings and evacuates said drill cuttings from a drillhole with a high velocity flowstream of bailing air, said drill rig including a frame including a portion generally overlying and disposed above said drillhole during drilling operations, said apparatus being supported generally beneath said frame for conveying said drill cuttings away from the vicinity of said drillhole;
said apparatus including a head member forming a flow conducting passage for conveying substantially all of said flowstream away from the vicinity of said drillhole;
an enclosure disposed spaced from said head member for separating drill cuttings from said flowstream;
a duct assembly interconnecting said head member and said enclosure and including a portion operable to effect bending of said duct assembly with respect to said head member to permit movement of said head member to a retracted position for transport of said drilling rig;
a stop member disposed on said frame portion and engageable with said duct assembly in the retracted position of said head member; and
means for moving said head member with respect to said frame between said retracted position and an extended position of said head member for conveying said flowstream from said drillhole.

9. A drill cuttings conveying apparatus for a portable drill rig which generates drill cuttings and evacuates said drill cuttings from a drillhole with a high velocity flowstream of bailing air, said drill rig including a frame including a portion generally overlying and disposed above said drillhole during drilling operations, said apparatus being supported generally beneath said portion of said frame for conveying said drill cuttings away from the vicinity of said drillhole;
said apparatus including a head member forming a flow conducting passage for conveying substantially all of said flowstream away from the vicinity of said drillhole;
an enclosure disposed spaced from said head member for separating drill cuttings from said flowstream;
means for moving said head member with respect to said frame between a retracted position for transport of said drill rig and an extended position of said head member for conveying said flowstream from said drill hole;
a duct assembly interconnecting said head member and said enclosure and supporting said enclosure on said drill rig, said duct assembly including a flexible duct section intermediate said head member and said enclosure, said flexible duct section being operable to effect bending of said duct assembly with respect to said head member to permit movement of said head member to said retracted position; and
actuator means for bending said flexible duct section from a substantially straight configuration to a bent configuration to permit said head member to be retracted.

10. The apparatus set forth in claim 9 wherein:
said means for moving said head member includes a pressure fluid operated actuator, and said apparatus includes a control circuit interconnecting said pressure fluid operated actuator and said actuator means for effecting retraction of said head member and bending of said duct assembly substantially simultaneously.

* * * * *